United States Patent Office 3,225,109
Patented Dec. 21, 1965

3,225,109
HALOGEN SATURATION OF NON-TERMINAL DOUBLE BOND
Theodore B. Simpson, Plainfield, N.J., and Frederick W. Evans, West Hill, Ontario, Canada, assignors to Hooker Chemical Corporation, Niagara Falls, N.Y., a corporation of New York
No Drawing. Filed June 27, 1963, Ser. No. 290,952
6 Claims. (Cl. 260—653.7)

This invention relates to the halogenation of perchlorofluorocarbons containing a non-terminal double bond by reacting the perchlorofluorocarbon with hydrogen fluoride and chlorine over carbon. More particularly, this invention relates to the reaction of hydrogen fluoride and chlorine over carbon with perchlorofluoro compounds that are entirely fluorinated, except for a non-terminal carbon to carbon double bond which has a chloro substituent on each of its carbon atoms, to produce saturated perchlorofluorocarbons wherein one of the carbon atoms of the original carbon-to-carbon double bond has two chloro substituents and the other has two fluoro substituents or one fluoro and one chloro substituent.

This is a continuation-in-part of each of co-pending application Serial No. 26,724, filed May 4, 1960, now abandoned, and co-pending application Serial No. 26,725, filed May 4, 1960, now abandoned.

It is an object of this invention to provide a new process for the halogenation of aliphatic perchlorofluorocarbons containing a nonterminal double bond.

Another object is to provide a process such that the raw material is converted to the desired products with a minimum of by-product formation, and the unreacted starting material can be recovered and recycled for further conversion to the desired product.

A further object is to provide such a process wherein the desired product is obtained in high yield.

A further object is to provide a halogenation process wherein the reaction pressure may be maintained at about atmospheric pressure.

A still further object is to provide a process for the halogenation of a non-terminal double bond in unsaturated perchlorofluorocarbons having from four to eight carbon atoms, wherein all of the saturated carbon atoms therein are perfluorinated and wherein the non-terminal double bond has a chloro substituent on each of its carbon atoms, to produce a saturated perchlorofluorocarbon wherein one of the said non-terminal carbon atoms has two chloro substituents and the other of said non-terminal carbon atoms has two fluoro substituents or one fluoro and one chloro substituent.

Other objects will become apparent to those skilled in the art from the description below.

These and other related objects are accomplished by the process of the present invention, which comprises halogenating an unsaturated perchlorofluorocarbon starting material having from four to eight carbon atoms having its saturated carbon atoms perfluorinated and containing a non-terminal carbon-to-carbon double bond having a chloro substituent on each of its carbon atoms, by introducing the starting material, hydrogen fluoride and chlorine into a reaction zone containing carbon catalyst, and maintained at a temperature between about two hundred and forty degrees centigrade and about six hundred degrees centigrade, and withdrawing the product from said zone.

The chemical theory behind the process of this invention is subject to much speculation but the process is illustrated by the following reactions, using the $C_4$ compound; however, the invention is not to be limited to them:

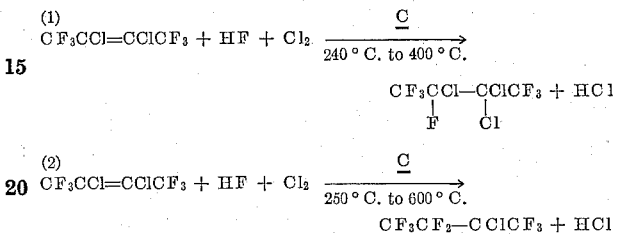

It has been found that the amount of the other products can be minimized, and the overall yield of the desired product is increased, by maintaining the operating conditions within certain limits and by recycling with the unreacted starting materials the other products that are capable of conversion to the desired product back for use in the process.

The starting compounds are those perhalo compounds which contain from four to eight carbon atoms, and have therein a non-terminal carbon-to-carbon double bond of the formula —CCl=CCl—. Among the other starting materials which may be used are: 2,3-dichlorooctafluoropentene-2; 2,3-dichlorodecafluorohexene-2; 3,4-dichlorodecafluorohexene-3; 2,3-dichlorotetradecafluorooctene-2; 1,2-dichlorohexafluorocyclopentene and the like.

As will become more evident hereinafter, this invention presents a preferential halogenation technique which is effected by the use of a carbon catalyst in conjunction with a critical temperature. The optimum temperature range is between about two hundred and forty degrees centigrade and about six hundred degrees centigrade. More preferably, when producing 2,2,3-trichloroheptafluorobutane from 2,3-dichlorohexafluorobutene-2, the temperature range is maintained between about two hundred and forty degrees centigrade and about four hundred degrees centigrade. And when producing 2,2-dichlorooctafluorobutane from 2,3-dichlorohexafluorobutene-2, the preferred temperature range is between about 275 and about 550 degrees centigrade. When using a starting material of 2,3-dichlorohexafluorobutene-2, at temperatures below two hundred and forty degrees centigrade there is a tendency to chlorinate to tetrachlorohexafluorobutane and more unreacted starting material and other halogenation products may be obtained. At temperatures above about six hundred degrees centigrade, formation of other side-products increases substantially.

We have found the overall yield of the desired product can be increased by maintaining the operating conditions within certain limits and by recycling the other products back for use in the process with unreacted starting material.

The contact time may vary from about 0.1 second to about sixty seconds at three hundred degrees centigrade, although the preferred contact time is between about 1.0 second and thirty seconds. In general, the amount of by-products increase with the contact time.

The proportions of reactants contacted with a catalyst may vary within relatively wide limits depending largely upon the nature of the reactants, the conditions of operations and the results desired. It is preferred that the reactants hydrogen fluoride and chlorine be substantially anhydrous. When feeding dichlorohexafluorobutene-2 to make trichloroheptafluorobutane, it was preferred to maintain the hydrogen fluoride concentration in one hundred percent excess of the stoichiometric requirement. However, it was observed that with higher hydrogen fluoride contents there was a rise in product content of both trichloroheptafluorobutane and dichlorooctafluorobutane. When feeding dichlorohexafluorobutene-2 to make unsymmetrical dichlorooctafluorobutane, it was preferred to maintain the hydrogen fluoride concentration in excess of the stoichiometric requirement.

The minimum ratio of hydrogen fluoride to organic material to be reacted should approach that theoretically required to react with the starting material. At ratios below this amount the conversion tends to be low. At high ratios of hydrogen fluoride to starting material, such as above fifteen to one, the HF acts as a diluent in the reaction zone. When producing 2,2,3-trichloroheptafluorobutane, the hydrogen fluoride to starting material is maintained at a ratio of about two to one, the ratio of chlorine to starting material should be between about 0.1 to one and about four to one. The minimum ratio of chlorine to organic material to be reacted should also approach that theoretically required to react with the starting material. At ratios below this the desired product is not obtained. And at high chlorine mol ratios there is a tendency to obtain higher amounts of compounds having the —CCl$_2$—CCl$_2$— grouping in it. When the desired product is trichloroheptafluorobutane, it has been found that at a reactor bath temperature of about two hundred and ninety degrees centigrade, when using a constant hydrogen fluoride mol fraction of about 0.6, the chlorine mol fraction should be above about 0.2.

The process of this invention also produces from the defined perchlorofluorocarbon starting materials compounds containing a —CCl$_2$—CCl$_2$— grouping. When using a C$_4$ starting material, the product also produced is 2,2,3,3-tetrachlorohexafluorobutane, which is a solid melting at eighty-three degrees centigrade. We have observed that the tetrachlorohexafluorobutane tends to approach an equilibrium concentration at any given set of reaction conditions, and therefore, this product can be separated from the effluent materials and recycled with the unreacted starting material for use in the process, or can be used alone as starting material to produce the products of this invention. In order to conveniently vaporize the solid material, it is first dissolved in a solvent for it, such as 2,3-dichlorohexafluorobutene. Other chlorofluoro carbons may also be used as a solvent for it as well. Improvement in yield may be obtained by recycling other byproducts as well.

As long as the reactants are preheated to the desired reaction temperature prior to contact with the catalyst, it matters little in what manner they are introduced. In practice, it is customary to preheat the reactants and introduce them simultaneously into the reaction zone containing the catalyst. After passing through the reaction zone the effluent gases may be cooled, condensed and passed through aqueous caustic solution to remove the HF, HCl and other materials soluble therein. The organic materials are then separated from the aqueous and caustic layers, purified and the unreacted starting materials recovered for repassing over the catalyst.

Atmospheric pressure was employed in all the reactions; however, pressures somewhat below and above atmospheric will also give satisfactory results.

A specific catalyst used in this invention is that prepared by Barnebey-Cheney Company, Columbus, Ohio, and marketed as "BD-9" granular active carbon which by analysis showed an ash content of 1.6 percent. However, other types of carbon may be used.

For the purposes of this invention contact time is defined as the ratio between the empty volume of the reactor (in arbitrary volume units) and the sum of the rates at which the reactants entered the reactor (in the same arbitrary volume units per unit time). The rates at which the gaseous reactants entered the reactor were obtained from the molar feed rates per unit time with the application of Charles' law relating the volume of a gas to its absolute temperature (it was assumed that at the temperatures used deviations from ideality were negligible).

In the examples below, the reactor comprised a two-inch diameter nickel pipe thirty inches long, immersed in a thermostatically-controlled salt bath and having an inlet and outlet as well as a central thermowell of three-eighths of an inch nickel tubing. The reactor was packed with a twenty-two-inch catalyst bed of eight-mesh activated carbon (Barnebey-Cheney BD-9), and maintained at a constant temperature by convenient means. A portion of the inlet tube was also immersed in the salt bath to serve as a preheater and vaporizer for the feed materials. It is within the realm of this invention to employ a vertical reactor similar in all respects to the horizontal reactor. It is also possible to use a fluidized bed reactor. It is to be understood that the invention is not limited to the type of reactor, or the means of heating the catalyst bed, for there are several convenient apparatus means for effecting the process of this invention.

The invention will be more fully understood by reference to the following detailed examples. For convenience, the process is described in connection with specific substances, but they are presented only for the purpose of illustration and not as a limitation, except as defined in the appended claims.

EXAMPLE 1

Hydrogen fluoride, chlorine gas and 2,3-dichlorohexafluorobutene-2 in the respective molar ratios of two to one to one, were passed into the above described reactor immersed in a salt bath maintained at a temperature of about three hundred and ten degrees centigrade. The tubular nickel reactor contained Barnebey-Cheney "BD-9" granular activated carbon. The gases had a contact time over the catalyst of about 6.5 seconds. It was found that there was a temperature rise in the catalyst bed of about forty degrees centigrade. The reaction products coming from the reactor were passed through an aqueous caustic solution to remove HF, HCl, and other materials soluble therein. At the end of this time, the reaction was purged with nitrogen gas, the organic material was separated from the aqueous caustic layers and dried. Vapor phase chromatographic analysis of a sample of the product indicated that the product comprised 10.6 mol percent starting material (2,3-dichlorohexafluorobutene-2), thirty-one mol percent tetrachlorohexafluorobutane, twelve percent dichlorooctafluorobutane, and forty-six percent 2,2,3-trichloroheptafluorobutane.

Table I below shows the tabular results of Example 1, along with other experiments performed in a manner after Example 1.

*Table I.—Conversion of 2,3-dichlorohexafluorobutene-2 over activated carbon*

| Example Number | HF mols | Cl₂ mols | Organic mols | Bath Temp., °C. | Max. Temp., °C. | Contact Time, sec. | Mol percent | | | |
|---|---|---|---|---|---|---|---|---|---|---|
| | | | | | | | 26 [1] | 46 [2] | 37 [3] | 28 [4] |
| 1 | 2 | 1 | 1 | 310 | 350 | 6.5 | 10.6 | 31 | 46 | 12 |
| 2 | 2 | 1 | 1 | 345 | 385 | 5.3 | 12.0 | 14.0 | 38 | 31 |
| 3 | 2 | 1 | 1 | 275 | 320 | 6.9 | 7.5 | 62 | 28 | 3.1 |
| 4 | 1.5 | 1 | 1 | 290 | 317 | 13 | 7.9 | 46 | 39 | 6.6 |
| 5 | 2 | 1 | 1 | 290 | 342 | 6.5 | 10.5 | 32 | 47 | 9.8 |
| 6 | 2 | 1.5 | 1 | 290 | 328 | 6.5 | 10.5 | 53 | 32 | 4.3 |
| 7 | 2 | 0.5 | 1 | 290 | 328 | 6.5 | 20.8 | 25 | 33 | 21 |
| 8 | 2 | 0.7 | [5] 1 | 290 | | 6.5 | 9.6 | 47 | 36 | 7.9 |
| 9 | 2 | 1 | [5] 1 | 310 | 368 | | 7.7 | 42 | 37 | 13.2 |

[1] "26" = 2,3-dichlorohexafluorobutene-2.
[2] "46" = 2,2,3,3-tetrachlorohexafluorobutene.
[3] "37" = 2,2,3-trichloroheptafluorobutane.
[4] "28" = dichlorooctafluorobutane.
[5] Organic feed composed of 65 mol percent "26" plus 35 mol percent "46". This is a preferred recycle of the by-product "46" to the feed stream.

Examples 8 and 9 show experiments with the feed being composed of a mixture of sixty-five mole percent 2,3-dichlorohexafluorobutene-2, and thirty-five percent tetrachlorohexafluorobutane. These examples are given to show that the undesirable reaction products (tetrachlorohexafluorobutane) can be recycled and used with the starting material to enhance the yield of 2,2,3-trichloroheptafluorobutane. In a similar manner other undesired reaction products may be separated and recycled with the starting material to improve the reaction conditions and upgrade the overall yield of the desired product.

Examples 8 and 9 also show that 2,2,3,3-tetrachlorohexafluorobutane alone can be converted to 2,2,3-trichloroheptafluorobutane and/or 2,2-dichlorooctafluorobutane in accordance with the teaching of this invention.

The compounds produced by the process of this invention are very stable to chemical attack, even in the presence of oxidizing agents. They have been suggested for use as dielectrics and refrigerants.

Various other modifications to the process can be made, and we do not wish to be limited to the examples which have been given, without departing from the spirit of the invention, except as defined in the appended claims.

We claim:

1. The process for the saturation of a non-terminal carbon-to-carbon double bond with a chlorine atom and a fluorine atom in an unsaturated aliphatic perchlorofluorocarbon starting material having from four to eight carbon atoms wherein the saturated carbon atoms are perfluorinated, and wherein the non-terminal double bond has a chloro substituent on each of its carbon atoms, which comprises: introducing the starting material, hydrogen fluoride and chlorine into a reaction zone containing a catalyst consisting essentially of carbon and maintained at substantially atmospheric pressure and at a temperature between about two hundred and forty degrees centigrade and about six hundred degrees centigrade, and withdrawing the product from said zone.

2. The process of claim 1 wherein the contact time of the reactants in the reaction zone is from about 0.1 second to about sixty seconds.

3. The process for the production of 2,2,3-trichloroheptafluorobutane which comprises: introducing 2,3-dichlorohexafluorobutene-2, hydrogen fluoride and chlorine into a reaction zone containing a catalyst consisting essentially of carbon and maintained at substantially atmospheric pressure and at a temperature between about two hundred and forty degrees centigrade and about four hundred degrees centigrade, and withdrawing the product from said zone.

4. The process according to claim 3 wherein 2,2,3,3-tetrachlorohexafluorobutane is also introduced into the reaction zone.

5. The process for the production of 2,2-dichlorooctaflouorobutane which comprises: introducing 2,3-dichlorohexafluorobutene-2, hydrogen fluoride and chlorine into a reaction zone containing a catalyst consisting essentially of carbon and maintained at substantially atmospheric pressure and at a temperature between about 250 degrees centigrade and about 600 degrees centigrade, and withdrawing the product from said zone.

6. The process according to claim 5 wherein 2,2,3,3-tetrachlorohexafluorobutane is also introduced into the reaction zone.

References Cited by the Examiner

UNITED STATES PATENTS 2,005,710  6/1935  Daudt et al. _____ 260—653.7
2,862,036  11/1958  Baranaukas et al. __ 260—653.6
2,981,762  4/1961  Woolf _____ 260—653.7

LEON ZITVER, *Primary Examiner.*
DANIEL D. HORWITZ, *Examiner.*